United States Patent Office 2,782,157
Patented Feb. 19, 1957

2,782,157
PROCESS FOR THE MANUFACTURE OF ALIPHATIC DINITRILES

Jonas Kamlet, New York, N. Y., assignor to The Goodyear Tire & Rubber Company, a corporation of Ohio No Drawing. Application June 6, 1955,
Serial No. 513,599

17 Claims. (Cl. 204—72)

This invention relates to a process for the manufacture of aliphatic dinitriles. More particularly, this invention relates to an improved process for the manufacture of compounds of the general formula:

$$CN(CH_2)_{2n}CN$$

where $n$ is an integer from 2 to 5, i. e. the alpha, omega-dinitriles of adipic acid, suberic acid, sebacic acid and dodecan-1,12-dioic acid. It has for its purpose to provide an improvement in the well known Kolbe electrochemical synthesis whereby these alpha, omega-aliphatic dinitriles may be obtained in good yields from readily preparable intermediates.

These aliphatic dinitriles are important industrial chemical intermediates. Thus, they may be hydrolyzed by heating with mineral acids to the corresponding alpha, omega-dibasic acids, which are widely used industrially in the manufacture of esters, polyesters, alkyd and other resins, plasticizers, lubricating compositions and lubricating oil additives, linear polyamide polymers of the nylon type, plastics, et cetera. By effecting this hydrolysis in the presence of alcohols, the corresponding dibasic esters may be obtained directly. These are valuable plasticizers, lubricating compositions and chemical intermediates. By hydrogenation or reduction with sodium in the presence of aliphatic alcohols, these aliphatic dinitriles may be converted to the corresponding alpha, omega-aliphatic diamines, which are widely applicable as intermediates in the manufacture of linear polyamides of the nylon type (e. g. hexamethylene diamine-1,6), textile chemicals and assistants, gas treating agents, pharmaceuticals, et cetera.

The aliphatic dinitriles are also useful as intermediates in the formation of polyamide resins (Mowry, U. S. Patent 2,617,786 (1952), and linear polymers (Mowry and Ringwald, Journ. Amer. Chem. Soc. 72, 4439–4441 (1950); Magat et al., Journ. Amer. Chem. Soc. 73, 1031–1035 (1951); Feuer and Pier, Journ. Amer. Chem. Soc. 76, 105–107 (1954); Monsanto Chemical Co., British Patent 677,516 (1952)).

It has long been known that the Kolbe synthesis can be employed to convert the salts of monoesters of dibasic acids, by electrolysis, to the diesters of higher dibasic acids; (Annalen 261, 111 (1891); Bull. Soc. Chem. (3) 29, 1038 (1903); Trans. Electrochem. Society 69, 287 (1936); ibid., 77, 459 (1940)). Thus, Gresham (U. S. Patent 2,439,425 (1948)) converts the trimethylamine salt of the half ester of adipic acid to the di-ester of sebacic acid. The I. G. Farbenindustrie (Leuna) prepared sebacic acid on a semi-industrial scale by the electrolysis of a methanolic solution of mono-sodium mono-methyladipate, isolation and hydrolysis of the dimethyl sebacate thus formed.

The Kolbe electrolysis of salts of half esters of dibasic acids involves several disadvantages. The preparation of the half ester is not easy. Upon standing or being heated, and especially under the conditions that obtain in the electrolytic cell, the salt of the half ester tends to dismutate to form the normal salt and the normal ester, e. g.:

$$2CH_3OOC(CH_2)_4COONa \rightarrow$$
$$CH_3OOC(CH_2)_4COOCH_3 + NaOOC(CH_2)_4COONa$$

The accumulation of the non-ionizing normal di-ester results in an increase in the resistance of the electrolytic bath, an increase in the voltage and a decrease in current efficiency. The formation and accumulation of the normal salt of the dibasic acid involves a more serious disability of the process in that it often results in ionization and dicarboxylation on both ends of the molecule. The polymerization of the polymethylene residues thus formed results in the deposition of a gummy or tarry coating on the anode, a serious diminution in the yields and in general renders the process difficult to carry out on an industrial scale.

The basis of my invention is the finding that the omega-cyanocarboxylic acids are ideal starting materials for the synthesis of alpha, omega-aliphatic dinitriles, and (through the intermediate conversion of said nitriles) for the manufacture of alpha, omega-aliphatic dibasic acids and esters. The starting materials for the process of this invention are the compounds of the general formula:

$$CN(CH_2)_nCOOH$$

where $n$ is an integer from 2 to 5.

In order to obtain good yields by the Kolbe electrolysis of these compounds, it is desirable to employ the following conditions:

(a) The electrolyte consists of a solution of a mixture of the free cyanoaliphatic acid and a member of the group consisting of the alkali metal, ammonium, primary amine, secondary amine and tertiary amine salts of the same cyanoaliphatic acid, the salt being present in amounts varying from 0.2 to 5.0 moles for every mole of the free cyanoaliphatic acid present. It is desirable but by no means essential that the concentration of solids within the electrolyte be in excess of 10%.

(b) The solvent employed comprises at least one member of the group consisting of water, methanol and ethanol. Methanol is the preferred solvent.

(c) The electrolysis is effected at a temperature between 0° C. and 70° C., and preferably between 20° C. and 50° C.

(d) The electrolysis may be effected in any type of cell described in the prior art for carrying out the Kolbe reaction. Diaphragms may be employed (to enable the anodic and cathodic products to be collected separately) but are not as a rule necessary. Rotating anodes, flowing-mercury cathodes and other devices may similarly be employed to advantage. It is important, however, that the anode be constructed of platinum (or platinum coated on a carrier, such as Carborundum) or iridium, and that it have a smooth surface, since coupling in the Kolbe reaction occurs to any extent only on a smooth anode. The material of construction of the cathode is not too important, although an inert material (such as carbon, graphite, platinum, copper, nickel steel or similar resistant alloys) is desirable.

(e) The electrolysis is effected with as high a current density on the anode as is feasible with the cell employed, since low anode densities favor the undesirable olefine, paraffin and tarry resin formation. Current densities in excess of 0.1 ampere per sq. cm., and preferably from 0.25 to 2.0 amperes per sq. cm., are desirable. The voltage drop across the electrodes may commence at 20 volts, but will gradually rise as the resistance of the electrolytic bath increases, and may be in excess of 75 volts at the conclusion of the electrolysis.

(f) It has been found desirable to effect the electrolysis until a major portion but not all of the free cyanoaliphatic acid is converted to the alpha, omega-aliphatic dinitrile. Actually, it is believed that the highly ionized salt of the cyanoaliphatic acid is the actual agent which is electrolyzed, rather than the poorly ionized free acid. The negative ion of the salt:

$$CN(CH_2)_nCOO^-$$

migrates to the anode and splits off carbon dioxide which is evolved as a gas. Two molecular residues $CN(CH_2)_n-$ then combine to form the corresponding alpha, omega-aliphatic dinitrile $CN(CH_2)_{2n}CN$.

The positive ions collect at the cathode, where they react with the free acid present in the electrolyte (evolving hydrogen which is liberated as a gas) and thus regenerate the salt of the cyanoaliphatic acid.

It has been found that good yields of the alpha, omega-aliphatic dinitrile are obtained if the electrolysis is not carried beyond the point where the free cyanoaliphatic acid disappears from the electrolyte. Thus, the presence of some free cyanoaliphatic acid in the electrolyte is desirable. While it is the salt of the cyanoaliphatic acid which is actually believed to be ionized, electrolyzed and converted to the end-product dinitrile, the mechanism above described (i. e. the neutralization of the positive ion at the cathode by the free acid to regenerate the salt of the cyanoaliphatic acid) makes it desirable to effect the electrolysis not beyond the point where the cyanoaliphatic acid is completely neutralized. Since we employ from 0.2 to 5.0 moles of cyanoaliphatic salt for every mole of free acid, and every mole of free cyanoaliphatic acid yields (after electrolysis and decarboxylation) 0.5 mole of the alpha, omega-aliphatic dinitrile, the electrolysis is effected until not more than 0.10 to 2.50 moles of aliphatic dinitrile has formed for every mole of salt of cyanoaliphatic acid originally present in the electrolyte.

As long as the electrolyte contains free cyanoaliphatic acid, various undesirable side-reactions are minimized. Reduction of the nitrile group by the hydrogen evolved at the cathode is largely avoided, and polymer resin and tar formation on the cathode is largely prevented.

Unlike the salts of the half esters of the aliphatic dibasic acids, the salts of the corresponding half nitriles (i. e. the cyanoaliphatic acids of this invention) are highly stable. They do not dismutate as do the half esters; they are stable to hydrolysis, oxidation and are not readily reduced under the conditions obtaining in the electrolytic cell. The use of the cyanoaliphatic acids in the process of this invention largely obviates or minimizes the above described disadvantages inherent in the prior art use of the half esters of these acids.

(g) The salts applicable for use in the process of this invention may be obtained by neutralizing the free cyanoaliphatic acid with a member of the group consisting of the alkali metal hydroxides, alkali metal alkoxides, ammonia, the primary amines (such as methylamine, ethylamine, aniline, ethylenediamine, etc.), the secondary amines (such as dimethylamine, diethylamine, methylethylamine, piperazine, piperidine, etc.) and the tertiary amines (such as trimethylamine, pyridine, alpha-picoline, beta-picoline, 2,6-lutidine, dimethylaniline, etc.). Best yields and greatest freedom from side-reactions are obtained when I employ the sodium salts and the tertiary amine salts (especially the pyridine, trimethylamine and picoline salts) of the cyanoaliphatic acids.

The starting materials for the process of this invention may be obtained by a variety of methods as, for instance:

(a) 3-cyanopropionic acid—by the reaction of beta-propiolactone with sodium cyanide to form the sodium 3-cyanopropionate (M. Pt. 91°–93° C.) followed by cautious acidification to obtain the free acid (M. Pt. 49°–51° C.) (Gresham et al., Journ. Amer. Chem. Soc. 74, 1323–5 (1952));

(b) 4-cyanobutyric acid—by heating alpha-oximinoadipic acid (Deckman, Berichte 33, 588) (M. Pt. 45° C.);

(c) 5-cyanovaleric acid—by reacting HCN with gamma-valerolactone or by the solution of the sodium salt of cyanocyclopentanone in water (Best and Thorpe, Journ. Chem. Soc. 95, 711) (B. Pt.—151°–152° C./5 mm. Hg);

(d) 6-cyanocaproic acid—by reacting 6-bromcaproic acid with sodium cyanide (Schultz—U. S. Patent 2,605,285 (1952)) (B. Pt. 158°–160° C./3 mm. Hg);

(e) The nitriles of this invention containing six and seven carbons (i. e. 5-cyanovaleric acid and 6-cyanocaproic acid) can also be prepared by the dismutation and dissociation of the diamides of the corresponding dibasic acids (i. e. adipic and pimelic acids) by the processes described in Germany Patents 805,758 (1951) and 806,454 (1951). The ammonium salts of these omega-cyano acids may also be obtained by the dismutation of these diamides described in my copending application Serial No. 510,840.

At the conclusion of the electrolysis, the electrolyte contains (in addition to the solvent), the aliphatic dinitrile formed, the salt of the cyanoaliphatic acid and some free cyanoaliphatic acid. These may be separated by any convenient method. A suitable (but by no means critical) method for effecting this separation involves distilling off the solvent and dissolving the residue in water. The aliphatic dinitriles are insoluble in water; the salts of the cyanoaliphatic acids and the free cyanoaliphatic acids are soluble in water, and may be separated from the insoluble dinitriles. On concentration of the aqueous solution, the salt and free acid may be recovered and returned to the process.

Taking into account recovered and recycled reagents, the yields of the aliphatic dinitriles obtainable by the process of this invention are from 85% to 90% of theory on the cyanoaliphatic acid employed. Current efficiencies may vary from 40% to 85%.

The alpha, omega-aliphatic dinitriles obtainable by the process of this invention are:

(a) Adipodinitrile—$CN(CH_2)_4CN$—B. Pt. 180°–182° C. at 20 mm. Hg, B. Pt. 295° C. at 760 mm. Hg.

(b) Suberodinitrile—$CN(CH_2)_6CN$—B. Pt. 176°–177° C. at 11 mm. Hg, B. Pt. 184°–186° C. at 15 mm. Hg.

(c) Sebacodinitrile—B. Pt. 199°–200° C. at 15 mm. Hg.

(d) Decane-1,10-dinitrile—B. Pt. 210°–212° C. at 15 mm. Hg. This is a new composition of matter and has never previously been prepared or described. Attempts to prepare this compound by the methods previously described in the prior art (e. g. by the dehydration of the diamide of the dodecan-1,12-dioic acid) as a rule yields cyclic and polymeric compounds.

The following examples are given to define and to illustrate this invention but in no way to limit it to reagents, proportions or conditions described therein. Obvious improvements will occur to any person skilled in the art. All proportions given are in parts by weight.

*Example I*

A flat electrolytic cell of glass construction, approximately 50 cm. x 25 cm. x 25 cm., fitted with alternating platinum anodes and nickel steel cathodes spaced 10 mm. apart is employed. The cell is closed and fitted with an efficient, water-cooled reflux condenser, and is surrounded by a cooling medium. The electrolyte is maintained in active circulation through the cell by a small pump and is at all times in violent agitation by virtue of the gas evolution at the electrodes and the circulation.

The electrolyte is made by dissolving 150 parts of sodium 5-cyanovalerate (1 mole) and 127 parts of 5-cyanovaleric acid (1 mole) in 1 liter of hot methanol. The solution is electrolyzed at an anode current density of 0.5 amp./cm.$^2$ (the voltage rising from 30 to 55 volts) over a period of six hours, or until the assay indicates the presence of 0.42 mole of the sebacodinitrile and 0.16 mole of free 5-cyanovaleric acid per liter in the electrolyte. The temperature during the electrolysis is maintained at 40°–50° C. by an efficient cooling of the cell.

At the conclusion of the electrolysis, the electrolyte is distilled to recover the methanol, and the residue is dissolved in 1 liter of hot water. The oily sebacodinitrile is separated from the aqueous phase. On concentrating and crystallizing the aqueous solution, unreacted sodium 5-cyanovalerate and 5-cyanovaleric acid is recovered and recycled to the process. The overall yield is 58 parts of sebacodinitrile (convertible by acid hydrolysis to 62 parts of sebacic acid) from 100 parts of 5-cyanovaleric acid.

*Example II*

A cell similar to that employed in the preceding example is used.

The electrolyte is made by dissolving 282 parts of 6-cyanocaproate (2 moles) and 120 parts of pyridine (1.5 moles) in 1 liter of methanol. The solution (now containing 1.5 moles of pyridine salt of 6-cyanocaproic acid and 0.5 mole of free acid) is electrolyzed at an anodic current density of 0.4 amp./cm.$^2$ (the voltage rising from 32 to 45 volts) over a period of five hours, or until the assay indicates the presence of 0.22 mole of the decane-1,10-dinitrile and 0.06 mole of free 6-cyanocaproic acid. The temperature during the electrolysis is maintained at 40°–50° C. by an efficient cooling of the cell.

By the separation of the components of the electrolyte (following the procedure employed in the first example) and recycling the unreacted salt and free acid, an overall yield of 85% of the theoretical of decane-1,10-dinitrile, based on the 6-cyanocaproic acid consumed, is obtained (i. e. 57.5 parts of decane-1,10-dinitrile (B. Pt. 210°–212° C. at 15 mm. Hg) convertible by hydrolysis to 60.5 parts of dodecan-1,12-dioic acid (M. Pt. 125°–126° C.) from 100 parts of 6-cyanocaproic acid).

Having described my invention, what I claim and desire to protect by Letters Patent is:

1. A process for the manufacture of aliphatic alpha, omega-dinitriles of general formula:

$$CN(CH_2)_{2n}CN$$

where $n$ is an integer between 2 and 5, which comprises submitting a solution containing a member of the group consisting of the omega-cyanoaliphatic acids of general formula:

$$CN(CH_2)_nCOOH$$

and a member of the group consisting of the alkali metal, ammonia, primary amine, secondary amine and tertiary amine salts of the same omega-cyanoaliphatic acid, to electrolysis in an electrolytic cell equipped with a smooth anode constructed of a member of the group consisting of platinum and iridium and thereafter separating the resultant aliphatic alpha, omega-dinitrile from the electrolysis product.

2. The process of claim 1 where the solution electrolyzed contains from 0.2 to 5.0 moles of the salt of the omega-cyanoaliphatic acid for every mole of the free omega-cyanoaliphatic acid.

3. The process of claim 1 where the compounds being electrolyzed are dissolved in a solvent consisting of at least one member of the group consisting of water, methanol and ethanol.

4. The process of claim 1 where the electrolysis is effected in methanol solution.

5. The process of claim 1 where the anode current density is in excess of 0.1 ampere per square centimeter.

6. The process of claim 1 where the anode current density is from 0.25 to 2.0 amperes per square centimeter.

7. The process of claim 1 where the electrolysis is effected until no more than the free omega-cyanoaliphatic acid content of the solution is converted to the aliphatic alpha, omega-dinitrile, and thereafter separating the dinitrile thus formed from the concomitant salt of the omega-cyanoaliphatic acid.

8. The process of claim 1 where the electrolysis is effected until 0.10 to 2.50 moles of the aliphatic alpha, omega-dinitrile is formed for every mole of the salt of the omega-cyanoaliphatic acid present in the solution.

9. The process of claim 1 where the solution electrolyzed contains an omega-cyanoaliphatic acid and the sodium salt of the same acid.

10. The process of claim 1 where the solution electrolyzed contains an omega-cyanoaliphatic acid and a tertiary amine salt of the same acid.

11. The process of claim 1 where the solution electrolyzed contains an omega-cyanoaliphatic acid and the pyridine salt of the same acid.

12. The process of claim 1 where the solution electrolyzed contains an omega-cyanoaliphatic acid and the trimethylamine salt of the same acid.

13. The process of claim 1 where the end-products of the electrolysis are separated by distilling off the solvent, dissolving the omega-cyanoaliphatic acid and salt in water and separating the resultant solution from the water-insoluble aliphatic alpha, omega-dinitrile.

14. The process of claim 1 applied to the preparation of adipodinitrile from 3-cyanopropionic acid.

15. The process of claim 1 applied to the preparation of suberodinitrile from 4-cyanobutyric acid.

16. The process of claim 1 applied to the preparation of sebacodinitrile from 5-cyanovaleric acid.

17. The process of claim 1 applied to the preparation of decane-1,10-dinitrile from 6-cyanocaproic acid.

References Cited in the file of this patent

UNITED STATES PATENTS

| | | |
|---|---|---|
| 2,257,814 | Rigby | Oct. 7, 1941 |
| 2,415,261 | Rogers | Feb. 4, 1947 |
| 2,439,425 | Gresham | Apr. 13, 1948 |
| 2,606,204 | Hogsed et al. | Aug. 5, 1952 |
| 2,680,713 | Lindsey et al. | June 8, 1954 |